United States Patent [19]
Oddou

[11] Patent Number: 5,577,131
[45] Date of Patent: Nov. 19, 1996

[54] DEVICE FOR SEGMENTING TEXTURED IMAGES AND IMAGE SEGMENTATION SYSTEM COMPRISING SUCH A DEVICE

[75] Inventor: Christophe Oddou, Ablon-Sur-Seine, France

[73] Assignee: U.S. Philips Corporation, New York, N.Y.

[21] Appl. No.: 237,489

[22] Filed: May 3, 1994

[30] Foreign Application Priority Data

May 5, 1993 [FR] France .................... 93 05365
Sep. 15, 1993 [FR] France .................... 93 10998

[51] Int. Cl.$^6$ .................................................. G06K 9/34
[52] U.S. Cl. ........................................... 382/173; 382/308
[58] Field of Search .................................... 382/9, 27, 55; 358/462, 464

[56] References Cited

U.S. PATENT DOCUMENTS

| | | | |
|---|---|---|---|
| 4,466,121 | 8/1984 | Damen et al. ............................ | 382/9 |
| 4,504,972 | 3/1985 | Scherl et al. ............................ | 382/9 |
| 5,335,298 | 8/1994 | Hevenor et al. ......................... | 382/9 |
| 5,347,594 | 9/1994 | Grimaud ................................. | 382/273 |

FOREIGN PATENT DOCUMENTS

| | | | |
|---|---|---|---|
| 0547696 | 6/1993 | European Pat. Off. ......... | H04N 1/40 |
| 0545474 | 6/1993 | European Pat. Off. ......... | H04N 1/41 |
| 2660459 | 4/1991 | France .......................... | G06F 15/62 |

OTHER PUBLICATIONS

Linnett, "Texture Segmentation Using Directional Operators" Feb. 1990 pp. 2309–2312.
Patel et al, "Texture image Classification and segmentation . . . " Jul. 1992 pp. 92–95.
Quiguer et al, "Fast and Auto–Adaptative Morphological Segmentation . . . " 1994 pp. 371–374.
R. Leonardi, PhD Thesis, "Segmentation adaptative pour le codage d'images", Thesis No.: 691 (1987).
"Morphological Segmentation" by F. Meyer and S. Beucher in Journal of Visual Communication and Image Representation, vol. 1, No. 1, Sep. 1990, pp. 21–46.

Primary Examiner—Leo Boudreau
Assistant Examiner—Chris Kelley
Attorney, Agent, or Firm—Leroy Eason

[57] ABSTRACT

A device for segmenting textured images on the basis of digital signals which are representative of said images by characterization of each texture by using representative parameters and by decomposition of each image into regions associated with different textures, said device comprising, for said characterization of the texture, a sub-assembly (100) for directional morphological filtering and a sub-assembly (200) for determining the texture parameters, and, at the output of this sub-assembly (200), a sub-assembly (300) for segmentation into regions by means of the technique of extracting watershed lines in a texture parameter image subdivided into blocks of a given size. A sequencing stage (600) furnishes the different control signals of said sub-assemblies.

15 Claims, 6 Drawing Sheets

5,577,131

DEVICE FOR SEGMENTING TEXTURED IMAGES AND IMAGE SEGMENTATION SYSTEM COMPRISING SUCH A DEVICE

BACKGROUND OF THE INVENTION

1. Field of the Invention

The invention relates to a device for segmenting textured images on the basis of digital signals which are representative of said images, by defining each texture by representative parameters and decomposition of each image into regions associated with the different textures. The invention can be used, for example for preprocessing images before their transmission and/or storage. The invention also relates to an image segmentation system comprising such a device.

2. Description of the Related Art

The transmission or storage of images within very short periods of time necessitates very high data rates which cannot generally be realised for economic and technical reasons. It is thus necessary to compress the information to be transmitted (or to be stored). Present data compression techniques are conventionally based on signal processing by means of an orthogonal transform with compression rates of about 10. Another approach, based on a better analysis of the images concerned and leading to higher compression rates, employs a method of preprocessing said images. Such method consists of considering the images as being constituted by an assembly of homogeneous regions each defined by a contour and an internal texture.

Such an image preprocessing method is described, for example, in the document "Segmentation adaptative pour le codage d'images", PhD thesis no. 691 (1987) presented by Mr. R. Leonardi at the Dépanement d'Electricité de l'Ecole Polytechnique Félérale of Lausanne. It provides a correct segmentation into homogeneous regions when the luminance varies only weakly in each of these regions, but leads to a severe oversegmentation when these regions correspond to grass, raffia, wood textures etc. or, in general, to zones in which a sort of structured and more or less periodical aspect can be observed which is defined by a primary grain and one or several rules of disposition or repetition of this grain on an entire surface. For treating such textures, French Patent Application no. 2660459, whose introductory paragraph describes the diversity of currently known segmentation processes in accordance with the texture type concerned, proposes a segmentation method which is suitable for any type of image and comprises particularly the following basic steps: characterization of each texture by an assembly of parameters forming a prototype vector and classification by decomposition of the image into regions associated with the different textures, with a possible merging of the regions obtained.

SUMMARY OF THE INVENTION

It is a first object of the invention to provide a device for segmenting textured images in accordance with a novel method which carries out the aforesaid basic steps.

To this end the invention relates to a segmentation device as described in the opening paragraph and is characterized in that said device comprises:

(A) for characterization of the texture, a first sub-assembly for directional morphological filtering followed by a second sub-assembly for determining the texture parameters;

(B) at the output of the second sub-assembly for determining the texture parameters, a third sub-assembly for segmentation into regions by the technique of extracting watershed lines in a texture parameter image subdivided into blocks of a given size; and (C) a sequencing stage for furnishing different control signals for said sub-assemblies.

The structure of the device thus proposed is novel for the following reason. The mathematical morphology which, for effecting image segmentation, uses a very efficient tool referred to as the watershed line extraction, generally uses this tool for non-textured grey-tone images, i.e. for isolating luminance zones wherein luminance is practically or relatively constant. In principle, this technique is inapplicable in the case of textured images because the zones corresponding to each texture do not have a constant luminance. However, the difficulty which is thus apparent may be reconciled by reconstituting, via original preprocessing operations, the images to which the morphological tool may be applied.

Advantageously, the segmentation device is characterized in that:

(A) said directional morphological filtering first sub-assembly comprises at least:
  (a) a first memory for storing digital signals which are representative of the image to be segmented;
  (b) at the output of this first memory, a directional morphological filtering circuit;
  (c) a second memory for storing the obtained filtered image:
  (d) a subtracter and, at its output, a third memory for storing an image of the residue obtained from the difference between the original image and the filtered image;

(B) said second sub-assembly for determining the texture parameters comprises at least:
  (e) a circuit for integrating the image of the residue;
  (f) a series arrangement of a fourth memory for storing the image of the texture characteristics obtained after filtering, a circuit for spatial sub-sampling of this image and a circuit for computing the morphological gradient;
  (g) a memory for storing the global gradient present at the output of said morphological gradient computing circuit;

(C) said third sub-assembly for segmentation comprises a series arrangement of:
  (h) a morphological filtering circuit;
  (i) a seventh memory for storing the gradient thus filtered;
  (j) a first circuit for segmentation by means of computing the watershed fines;
  (k) an eighth memory for storing the image of the labels.

In a specific embodiment the segmentation device according to the invention is particularly characterized in that (A) said directional morphological filtering first sub-assembly comprises:
  (a) a first memory for storing the digital signals which are representative of the image to be segmented;
  (b) at the output of this first memory, a first four-position switch followed by a parallel arrangement of four directional morphological filtering circuits;
  (c) a second memory for storing the four successively filtered images obtained;
  (d) a subtracter and, at its output, a third memory for storing the four images of the residues successively obtained from the difference between the original image and each of the four filtered images;

(B) said second sub-assembly for determining the texture parameters comprises:

(e) a circuit for integrating the images of the residues;

(f) at the output of said circuit, a second four-position switch followed by four parallel branches each comprising a series arrangement of a fourth memory for storing the image of the texture characteristics associated with the corresponding filtering operation, a circuit for spatial sub-sampling of this image, a circuit for computing the morphological gradient, and a fifth memory for storing said gradient;

(g) an adder for the output signal of said fifth memories;

(h) a sixth memory for storing the global gradient present at the output of said adder;

(C) said segmentation third sub-assembly comprises a series arrangement of:

(i) a morphological filtering circuit;

(j) a seventh memory for storing the gradient thus filtered;

(k) a first circuit for segmentation by means of computing the watershed lines;

(l) an eighth memory for storing the image of the labels.

A further embodiment of the segmentation device is characterized in that it comprises, at the output of said segmentation third sub-assembly, a further sub-assembly for merging the regions by establishing a hierarchic classification of said regions and, successively for each of the pairs of regions appearing in this classification, a decision of merging or not merging as a function of a criterion related to the sizes which are representative of the distribution of the pixels of each region.

In a preferred embodiment the segmentation device according to the invention is also characterized in that it comprises, at the output of the segmentation sub-assembly, a further sub-assembly for sharpening the contours by repeating the extractions of the watershed lines for subdivisions of the image into blocks of a smaller size, and this in an iterative way until the resolution of a pixel is reached.

It is another object of the invention to provide a system for segmenting images generally constituted notably, but not exclusively, by textures, which system comprises to this end an image segmentation device as described hereinbefore.

To this end the invention relates to a segmentation system comprising said device but also:

(A) at the output of said device constituting a first sub-assembly for initial segmentation, a second sub-assembly for separating the homogeneous regions which correspond exclusively to textures or to regions having a slow luminance variation, and for separating heterogeneous regions which do not correspond, or correspond to a minor extent, to textures by determining, for each region, the residual difference between an approximation of the output image of said segmentation sub-assembly and its input image and by comparing values of this difference or of a directly related size with a threshold for the whole of said region;

(B) at the output of said separation sub-assembly, a third sub-assembly for sorting the homogeneous regions into textured regions and into regions having a slow luminance variation;

(C) also at the output of said separation sub-assembly, a fourth sub-assembly for complementary segmentation of the heterogeneous regions.

In a particular embodiment this system is characterized in that said sub-assembly for separating the regions comprises a series arrangement of a circuit for polynomial approximation on the basis of the original images and those obtained by initial segmentation, a polynomial synthesis circuit for restoring an approximation function of the luminance of each region, a memory for storing the output signals from said synthesis circuit, a circuit for subtracting, for the concerned region, each original image and the image of the polynomials present in said memory, a memory for storing the residue constituted by this difference and a first test circuit for this residue or for a quantity which is directly related thereto in view of the separation, by way of comparison of said residue with a threshold, of regions obtained by said initial segmentation into homogeneous regions and into heterogeneous regions, and in that said sub-assembly for sorting the homogeneous regions comprises a second test circuit for computing, across the whole concerned region, the standard deviation of the residue from the average value and for comparing this standard deviation with a threshold.

In accordance with the proposed embodiment this system is characterized in that said sub-assembly for complementary segmentation comprises a series arrangement of a circuit for selecting the heterogeneous regions, a memory for storing said regions, a segmentation device and a memory for storing the image of the labels resulting from said segmentation.

However, in an advantageous embodiment in which the number of circuits can be reduced, said system is characterized in that said sub-assembly for complementary segmentation comprises a series arrangement of a circuit for exclusive selection of the heterogeneous regions, the output of said circuit being connected to a second input of the first memory for storing the digital signals which are representative of the image to be segmented, and a segmentation device whose input is connected to a second input of said first memory and whose output is connected to the eighth memory for storing the image of the labels.

This segmentation system may include the means for coding the various information components obtained from segmentation and corresponding to each region.

These and other aspects of the invention will be apparent from and elucidated with reference to the embodiments described hereinafter.

DETAILED DESCRIPTION OF THE PREFERRED EMBODIMENTS OF THE INVENTION

Figure 1:
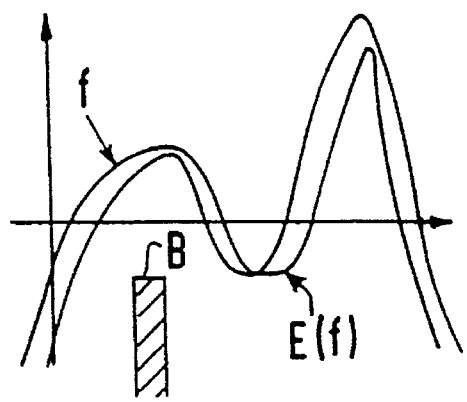
FIGS. 1 to 4 illustrate different basic morphological transforms of a function by a structuring element.

Before describing the embodiments, some notes relating to the textures and the techniques by which these can be analyzed will be useful. Although there is no strict definition of the notion of texture, any region can be qualified as such which, whatever the zone observed, gives the same visual impression, while the texture thus observed may be considered as a macrotexture or, in contrast, as a microtexture in accordance with the distance from which it is observed. A macrotexture seems to be defined by a basic theme—a kind of grain—and by rules of dispositioning this theme in the space by means of, for example, more or less regular repetition. Such a texture has a relatively structured, periodical and thus ordered aspect but, viewed from a larger distance, this structure and this periodicity may disappear and, in contrast, the aspect may become disordered.

This difficulty of formally describing a basic theme and its disposition rules have led to the search for texture characteristics which can more easily be quantified. This search has proceeded through successive steps of analysis for extracting characteristic parameters from the texture(s) concerned, and of segmentation for partitioning an image into regions having homogeneous texture characteristics, which steps are often followed by a synthesis step for the purpose of restoring the textures, for example on the basis of parameters initially extracted for each region.

In the segmentation techniques used it is generally attempted to detect discontinuities in an image or, in contrast, similarities of the image characteristics, which means that the real contours of the objects (i.e. the discontinuities in the image) are reproduced as precisely as possible while minimizing the number of regions in order to avoid the formation of artificial boundaries which do not correspond to a discontinuity. The mathematical morphology particularly has available of a very efficient technique for image segmentation, but only in applications where the images concerned have non-textured grey tones corresponding to objects of a relatively constant luminance. This technique, which is referred to as the watershed line extraction (hereinafter abbreviated to WSL), is described in the article entitled "Morphological Segmentation" by F. Meyer and S. Beucher in "Journal of Visual Communication and Image Representation", Vol. 1, no. 1, September 1990, pp. 21–46.

For a better understanding of the mathematical morphology and particularly this WSL technique, it will be useful to represent the luminance function as a relief in which the pixels of the grey level images appear clearer as they are more elevated. This also applies to the gradient of this luminance function and, in this relief, the crest lines of the gradient correspond to the boundaries of the regions to be segmented. An image may thus be considered as a juxtaposition of catchment basins at the bottom of which there is a regional minimum, a son of plateau formed of dots having a substantially uniform altitude, with all the neighbouring dots having a higher altitude. If one pierces a hole in each regional minimum and if one subsequently proceeds to a progressive immersion of the relief based on regional minima, while taking care that the flood level rises at a constant speed, it will be possible, whenever the floods from the two regional minima meet each other, to construct a dam along the crest line corresponding to the line where the floods meet each other so that the floods from the two separate catchment basins do not merge.

However, the segmentation thus obtained by means of this WSL technique cannot be applied to textured images because they do not have a constant luminance. The Applicant's company has nevertheless attempted to use this technique for an image constructed from correctly selected texture parameters, rather than for a luminance image. For an original image which is subdivided into blocks of pixels, these blocks have close texture parameters if they relate to the same texture. Consequently, in images which are no longer the original images but images of parameters constructed from these original images, the blocks of pixels of the same texture are characterized by very close grey levels.

It is thus possible to apply the WSL technique to an image evaluation other than luminance, viz. to one of these parameters. For example, in the application described hereinafter, to a morphological gradient G whose definition will be given hereinafter.

Figure 3:
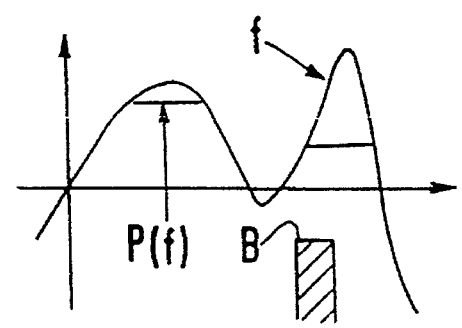
Figure 4:
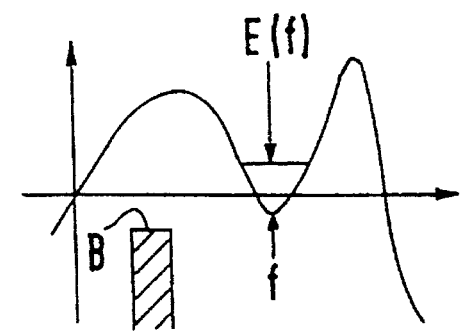

It will be useful to first describe the main morphological tools currently used for exploring the geometrical structure of images. The morphological transform of a binary image represented by an assembly of discrete dam, denoted X and defined in the space N of relative integral numbers, makes use of a structuring element denoted B and which, chosen as a function of the problem posed (form, dimension, orientation, etc.), is intended to interact with the image for extracting useful geometrical information components. The different basic transforms permitted by such a structuring element B are the erosion and the dilation, illustrated in FIGS. 1 and 2, as well as their combinations, i.e. opening and closure, illustrated in FIGS. 3 and 4.

The morphological erosion of an image X by a structuring element B is denoted X(−)B in this case and is used for narrowing this image. This constriction may be written as follows:

$$X(-)B=[X+(-b)]$$

where X+(−b) is the result of a translation of the value b of the image X. The resultant image is written, for example as:

$$Y=\text{"eroded function Y of X by B"}=E^B(X)$$

Similarly, the morphological dilation of X by B is denoted X(+)B and is used for dilating the image, which dilation may also be denoted as [X+(+b)] and corresponds, as hereinbefore, to a translation of the value b of the image X, but in the opposite direction, so that an image Y is obtained which is denoted as:

$$Y=\text{"dilated function Y of X by B"}=D^B(X).$$

These two basic operations may be combined to perform the more complex morphological transforms. The opening of an image X by a structuring element B, here denoted [X(−)B](+)B, consists of carrying out an erosion followed by a dilation and its resultant image is written, for example as:

$$P=D^B[E^B(X)]$$

Similarly, the closure of an image X by B, denoted [X(+)B](−)B consists of carrying out a dilation followed by an erosion and its resultant image is written as:

$$F=E^B[D^B(X)]$$

The two latter transforms have for their object to smooth the contours of the assemblies on which they act. In fact, an opening suppresses the contour protuberances which are smaller than the structuring element, and a closure closes the contour dips which are smaller than the structuring element. Generally, these two transforms thus eliminate the components which are smaller than the structuring element used.

The functions thus defined for simple geometrical boundaries, in this case for the binary images, may be generalized for grey-tone images. If (x,y) defines the position of a pixel X of the grey level image a(x,y), the eroded grey level E(x,y) of X by B is given by the expression:

$$E(x,y)=\min[a(x-i,y-j)-b(-i,-j)]$$

where $b(i,j)=0$ or $-\infty$ (minus infinity) dependent on whether $(i,j)$ belongs to B or not. The dilated grey level $D(x,y)$ of X by B is similarly given by the expression:

$$D(x,y)=\max[a(x+i,y+j)+b(i,j)]$$

Figure 2:
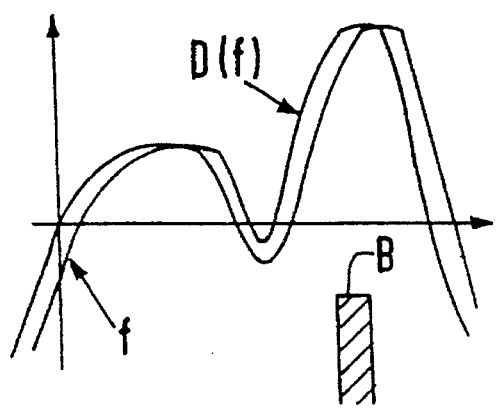

As is shown in the examples of FIGS. 1 and 2 illustrating the erosion and the dilation, respectively, of a function f by a structuring element B, the erosion tends to smooth the crests of the relief, i.e. to suppress the bright patches of small thickness, and the dilation tends to fill up the dips, i.e. to suppress the dark patches which also have a small thickness. Similarly, with grey tones, the opening P and the closure F of a function f by the structuring element B, illustrated in FIGS. 3 and 4 and denoted as:

$$P(x,y)=\sup[E^B(f(u,v))]$$

$$F(x,y)=\inf[D^B(f(u,v))]$$

respectively, with $(u,v)$ relating to B, have for their object to suppress the luminance peaks and the luminance troughs, respectively, whose size is smaller than that of the structuring element, while leaving the other forms substantially unchanged.

Among other types of transforms, the morphological gradient G which is given by the expression:

$$G(f)=[(f(+)B)-(f(-)B)]/2$$

may be defined, which corresponds, as it were, to half the difference between the dilated function of f by B and the eroded function of f by B.

Figure 5:
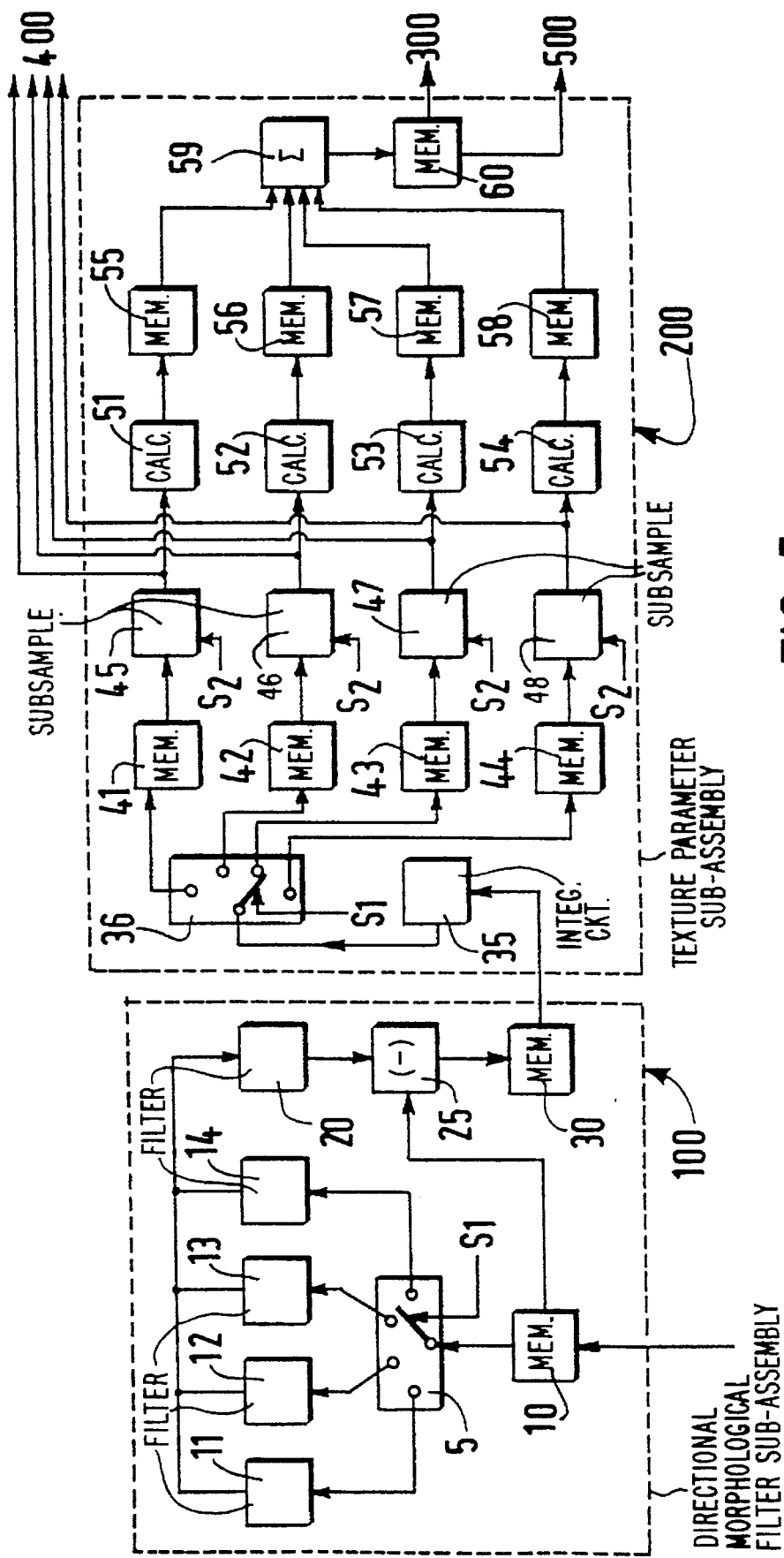
FIGS. 5 and 6 show an embodiment of a segmentation device according to the invention.
Figure 6:
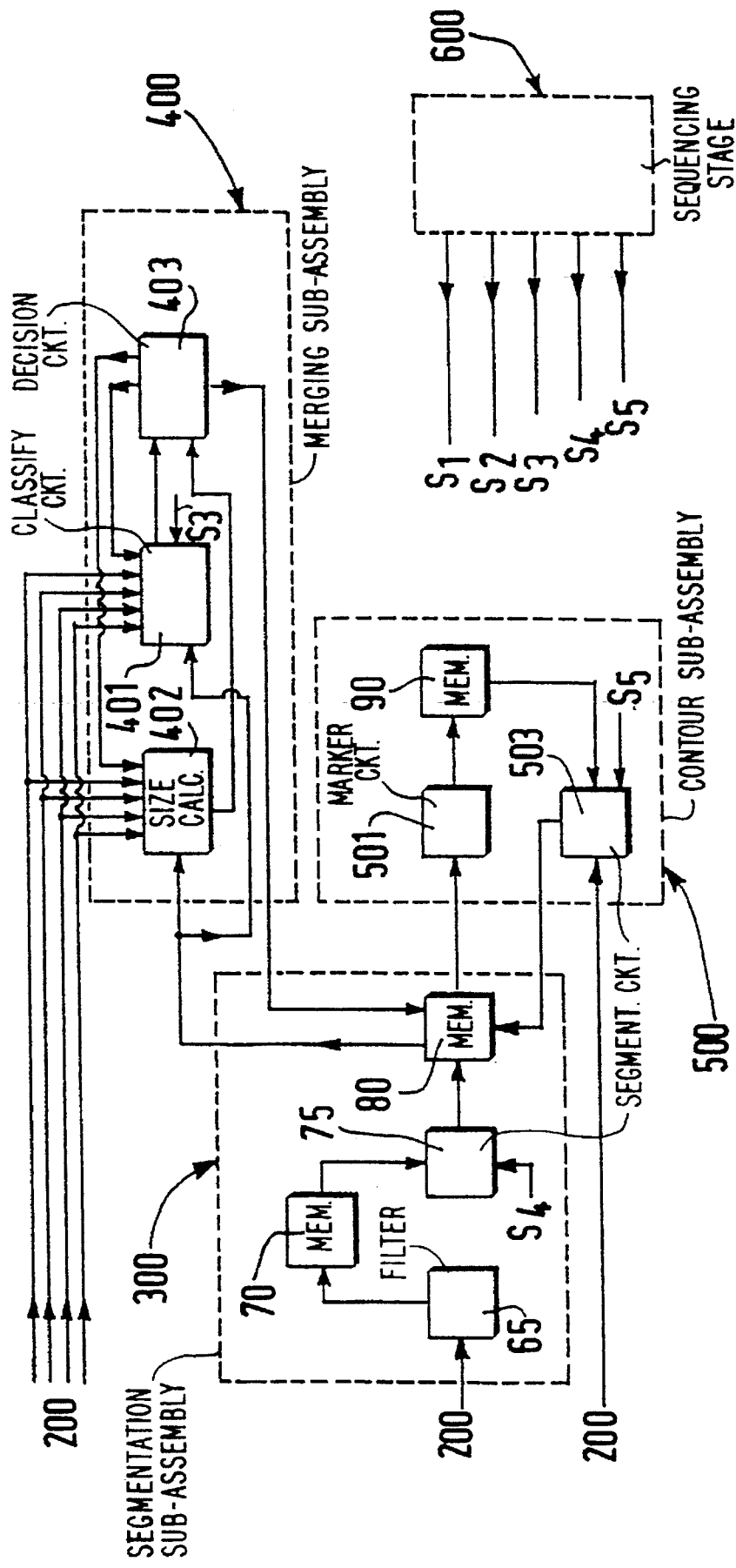

After this description relating to textures and morphological transform techniques, the image segmentation device according to the invention will now be described. This device, which is shown in FIGS. 5 and 6 to be considered conjunctively, comprises a sub-assembly 100 for directional morphological filtering. This sub-assembly 100 comprises a first memory 10 for storing the digital signals which are representative of the image to be segmented (in this case as a function of the different textures which it contains). The output of this memory 10 is connected to the common input of a first four-position switch 5, followed, at its four parallel outputs, by four directional morphological filtering circuits 11, 12, 13, 14. The four filtering circuits 11 to 14 provide the possibility of realising four transforms of the image, each consisting of a successive opening and closure for which the structuring element is plane and has a width of 1 pixel, a length of 3 pixels and orientations of 0°, 45°, 90° and 135°, respectively. The four filtered images are successively stored in a second memory 20. A third memory 30 provides the possibility of storing the image of the residue for each structuring element, which residue is obtained at the output of a subtracter 25 from the difference between the original image stored in the memory 10 and each of the filtered images stored in the memory 20 (each residue is given by the absolute value of this difference). The value of this residue for each pixel and for each of the four morphological filtering operations constitutes a texture parameter and it is possible to establish as many texture parameter maps as there are variants of such filtering operations.

In this implementation of the device shown in FIGS. 5 and 6, each pixel of the image is thus replaced by four information components whose regrouping may be considered as a vector having four components. However, a texture cannot be defined from pointed attributes, because a single pixel is neither representative of the grain nor of the rules of disposition of the structure and the neighbourhood of this pixel must be used. To be able to extract the texture characteristics in an objective manner, it is necessary to know a sample thereof, having a size which is sufficient to enable effective recognition of the texture portion which is present.

To this end a sub-assembly 200 for determining the texture parameters is arranged at the output of the sub-assembly 100. This sub-assembly 200 comprises a circuit 35 for integrating the image of the residue, which circuit is arranged at the output of the third memory 30 and with which homogeneous zones can be formed where the value of the vectorial components is substantially constant over large areas. The size m×n of the integration window is a function of the type of the original image: in the present case a window dimension of 24×24 pixels is maintained for images which are constituted by 512×512 pixels, but it will be evident that the presence of macrotextures in the image will necessitate a higher resolution in order that the windows can contain all the texture information. On the other hand, the integration thus realised is a simple computation of the average value in this case, but, in such a computation, for example the influence of each pixel could be weighted as a function of its distance to the centre of the window.

The output of the integration circuit 35 is connected to the common input of a second switch 36 whose non-common outputs, four in this case, are connected to four parallel branches comprising a series arrangement of fourth memories 41 to 44 and sub-sampling circuits 45 to 48. The memories 41 to 44 provide the possibility of successive disposal, in parallel, of four images of texture characteristics corresponding to each of the four morphological filtering operations performed. The sub-sampling circuits 45 to 48 provide the possibility of a spatial sub-sampling of these images over all p×q pixels in the horizontal and vertical directions, respectively, and each block of p×q pixels is now replaced by a sub-sample which will hereinafter be referred to as macropixel (in the example described, p=q=16). Associated with each macropixel is the value taken from the memories 41 to 44 and corresponding to the average value of the texture parameters which is obtained after integration on the selected window. This sub-sampling operation now enables all the subsequent operations at the resolution p×q to be carried out, with the elementary entity being the block p×q and no more the pixel. It should be noted that within such a block the choice has been made for a simple computation of the average value, but other, more complex computations may be adopted. Notably for refining the boundaries between blocks, the contribution of each pixel may also be weighted as a function of its distance to the centre of the block in accordance with, for example a Gaussian law.

The four parallel branches are also provided with four circuits 51 to 54 for computing the morphological gradient, four memories 55 to 58 for storing the gradients thus computed, which memories are referred to as fifth memories. The outputs of these fifth memories constitute those of the four branches and are connected to an identical number of inputs of an adder 59 supplying a global gradient $G_G$ which is stored in a sixth memory 60. The description hereinbefore has dealt first with the WSL technique and then with the technical choice of applying this technique to the images constructed from relevant texture parameters and particularly from the morphological gradient G. In fact, within a texture the variations of the gradient G are relatively less important, while at the level of the boundaries between regions of different texture the global gradient is higher (higher as the contrast between these regions is greater).

The actual segmentation is now realised in a segmentation sub-assembly 300. This segmentation by way of the WSL technique comprises two steps, the first consisting of marking the regions which are to be extracted and the second consisting of outlining the regions of the image in a definitive manner. A marker, which is a small assembly of pixels within the region and constitutes, as it were, the nucleus of its development should correspond in a unique manner to the region which it marks. A good candidate for this marker role is the minimum of the global gradient G in each region. It can be ascertained that the application of the WSL technique to all the detected regional minima leads to a relatively considerable oversegmentation because some minima are not really significant (they are only due to small fluctuations of the gradient within anyone of the textures).

To avoid this oversegmentation, a preprocessing operation is carried out in the sub-assembly 300, which operation eliminates these insignificant minima. This preprocessing treatment is realised with the aid of a circuit 65 for morphological filtering by way of geodesic erosion. In addition to the description hereinbefore, relating to several basic functions of the mathematical morphology, it is here noted that the geodesic distance $d_z(x,y)$ between two dots x and y of an assembly Z is the lower limit of the different possible path lengths between x and y in Z. This distance may be denoted as $d_z(x,y)=\inf[\text{lengths } C(x,y)]$ where C designates an arbitrary path in Z between x and y (between two dots situated in two distinct catchment basins as obtained by the WSL technique, this distance is thus conventionally considered as being infinite because these two dots cannot be confluent). The geodesic sphere having a radius R centered on x thus is referred to as the assembly $S(x,r)$ of dots y relating to the same assembly Z, such that their geodesic distance $d_z(x,y)$ at the dot x is smaller than or equal to the radius R. With the aid of a structuring element B, an erosion or a dilation, such as defined hereinbefore, may subsequently be performed on such a geodesic sphere, with the same smoothing effect of the surface of the sphere occurs.

Figure 7:
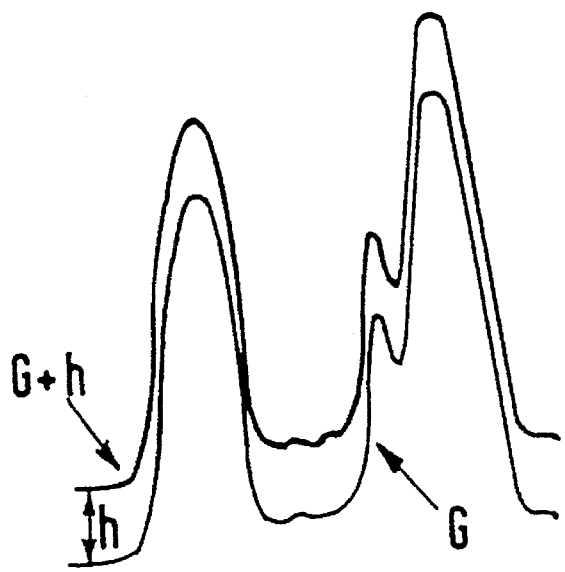
FIGS. 7 and 8 illustrate the way in which the morphological filtering of the global gradient is realised by geodesic erosion in the operation of the device according to the invention.
Figure 8:
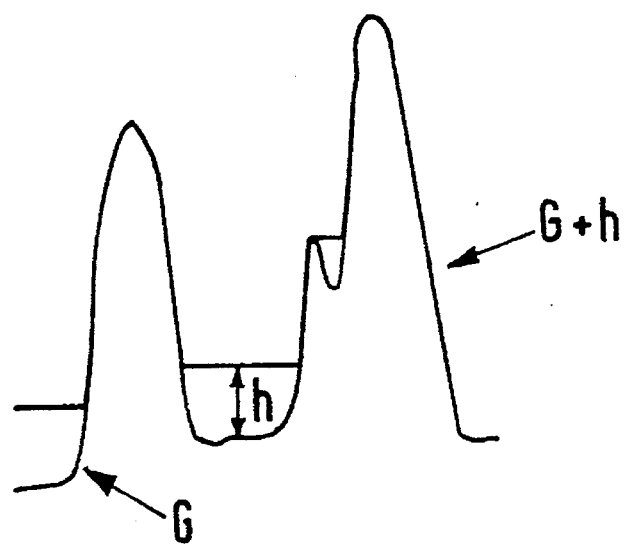

In the embodiment described here the regional minima are only maintained at a height h. FIG. 7 shows an example of the function G (global gradient) above which the function G+h is constructed, where h is a positive constant, and FIG. 8 shows with respect to the initial function G the function finally obtained after geodesic erosion by the circuit 65. A seventh memory 70 arranged in series with this circuit 65 ensures the storage of the image of the gradient thus filtered (in this finally obtained image the preprocessing treatment has actually consisted of suppressing the dips having a height of less than h and of filling the other dips on a height h). The output signal of the memory 70 is applied to a first segmentation circuit 75 for computing the watershed line (directly using the WSL technique) and this initial segmentation furnishes a map or image of labels with which the different regions originating from said segmentation can be identified. This image of labels is stored in an eighth memory 80. Subject to a possible merging of adjacent regions intended for remedying a possible oversegmentation of the image, the segmentation procedure is terminated. This merging procedure is carried out as follows.

For an appropriate choice of the constant h (not too high value), the image is often only oversegmented to a moderate extent. This oversegmentation may be reduced by performing a method of possibly regrouping adjacent regions, here realised by means of a sub-assembly 400 for merging the regions. The merging treatment realised in this sub-assembly comprises the following steps:

(a) establishing a hierarchic classification of the regions, whose successive elements are couples $(R_a, R_b)$ of adjacent regions in the order of decreasing proximity;

(b) for each of the pairs of regions of this classification, association (with each of the two compared regions) of a quantity which is representative of the distribution of their pixels;

(c) decision of merging or not merging the two regions as a function of a criterion related to said representative quantities.

These steps can be described in a more detailed manner. First, based on the information (supplied by the eighth memory 80) for marking the regions and the texture parameters (here the average value of the texture parameters on the integration window after sub-sampling), a classification circuit 401 considers in turns all the adjacent regions pairwise in the following way. For a given region $R_i$, $P_i$, which is the prototype of the region $R_i$, is the average vector of the assembly of vectors of parameters of the blocks constituting the region $R_i$, which can be defined as:

$$P_i = (1/N_i) \times p_k$$

where $N_i$ is the number of blocks of the region $R_i$ and $p_k$ is the vector of the parameters of the block k. With each region thus being marked by a prototype vector, the distance $d(R_i, R_j)$ between the region $R_i$ and each adjacent region $R_j$ may be evaluated, for example by using the Euclidean distance definition:

$$d(R_i, R_j) = \left[ \sum_1^N (p_i - p_j)^2 \right]^{1/2}$$

where N is the number of components of each vector and where $p_i$ and $p_j$ are said components for the prototype vectors $P_i$ and $P_j$, respectively.

When all the possible couples $(R_i, R_j)$ of adjacent regions have been classified as a function of the distance which separates them (independent of the definition adopted for this distance), with the couple $(R_a, R_b)$ whose parameter vectors are closest being the first element of this classification, a circuit 402 for computing the size which is representative of each region successively acts on each couple $(R_i, R_j)$ of said classification so as to determine, for each of the two regions of the couple, a quantity characterizing the distribution of the cumulation of pixels forming the region. This quantity, which is intended to constitute a son of index of compactness of the region, will be chosen to be equal, for example to the standard deviation S, with:

$$S^2 = (1/N_i) \sum_1^{Ni} \text{dist}^2(P_k, P_i)$$

where $N_i$ is the number of pixels representative (i.e. the number of blocks) of the region $R_i$ and dist is the distance in accordance with the metrical system chosen (the Euclidean distance in the above example).

A decision circuit 403 then authorizes (or does not authorize) the merging between the two regions of a couple on the basis of a criterion related to these representative quantities, for example when the following inequality is verified for two regions $R_a, R_b$:

$$\text{Dist}(R_a, R_b) < \min(S_a, S_b),$$

i.e. when the distance (in accordance with the metrical system chosen) between the two regions concerned remains below the lowest of the two standard deviation values $S_a, S_b$ for each region (this corresponds substantially to the situation where the centre of gravity of each cumulation of pixels is enclosed one within the other). In contrast, there will be no merging if the inequality is not verified. When two regions merge, a new prototype vector is computed for the new region thus constituted. An output signal of the circuit 403 is then applied to the memory 80 for updating the information for marking the regions, and to the circuits 401 and 402 for updating the classification realised by the circuit 401 and the standard deviation computation realised by the circuit 402 and can thus renew the succession of merging, reclassification and processing decisions for all the pairs of adjacent regions until the merging criterion is no longer verified.

This possible regrouping of adjacent regions definitively terminates the segmentation. The initial image is now substituted by a partition of this image into zones of similar texture parameters, with the basic brick or elementary entity of this partition being the image block of the size p×q. The resolution of the boundaries between these zones is thus also equal to the size of these blocks.

Figure 9:
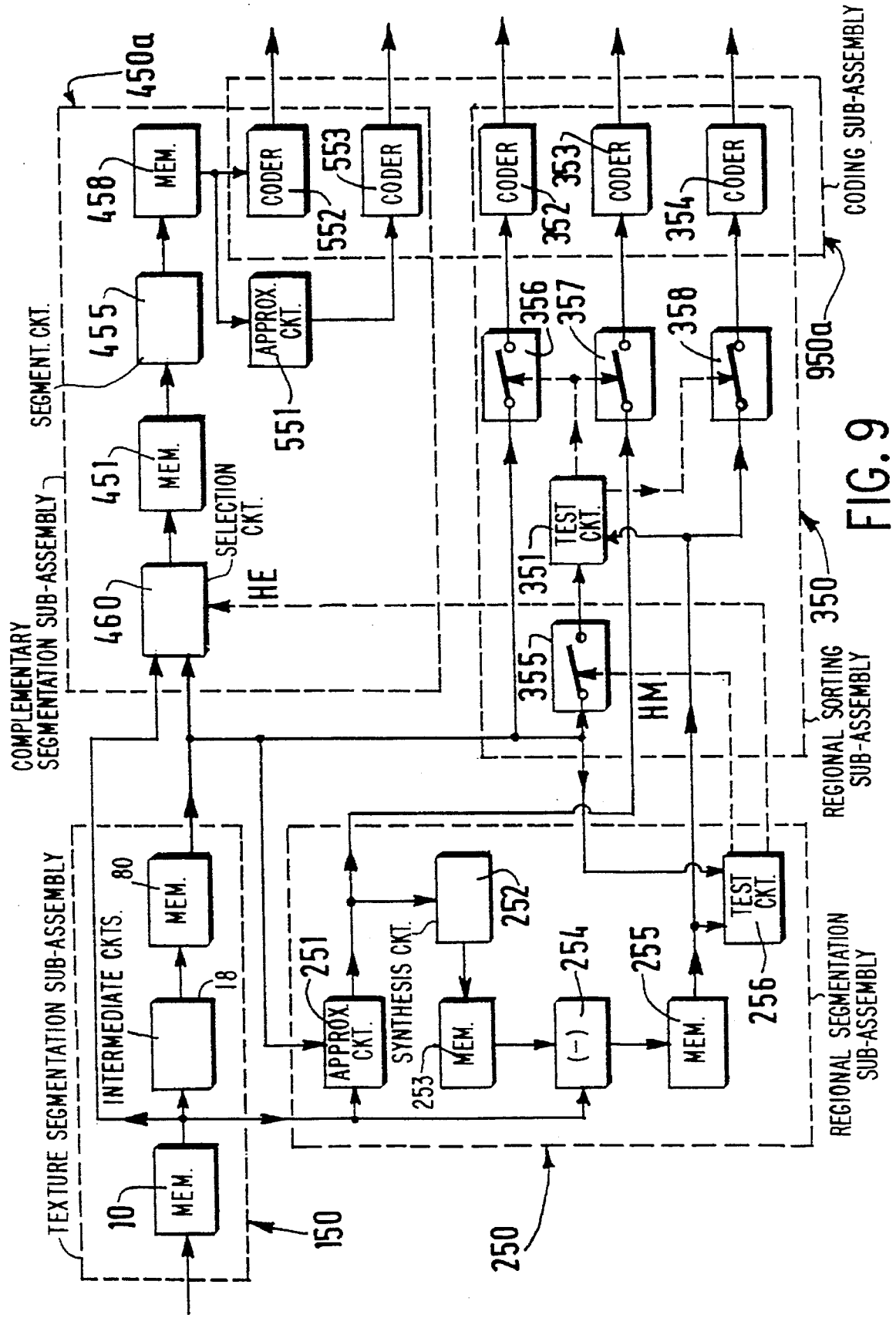
FIGS. 9 and 10 show two embodiments of a segmentation system according to the invention.

The device which has been described is adapted to segment images which are composed of textures only. However, most frequently every image is formed from a juxtaposition of textured regions and of regions which are not textured. A more complete segmentation system should thus be provided and this system, which is shown in FIG. 9 in a first embodiment, comprises the following sub-assemblies in this embodiment, viz. a first sub-assembly 150 for segmenting the textures, which is identical to the segmentation device described above (FIGS. 5 and 6). As the elements of the sub-assembly 150 are the same as those of the device, not all of them will be shown in FIG. 9: the Figure is limited to the input memory 10 which comprises the digital signals which are representative of the image to be segmented and the output memory 80 which comprises the image of the labels with which the different regions originating from the texture segmentation can be identified. The intermediate circuits which, in FIGS. 5 and 6, are arranged between these two memories are denoted by the reference numeral 18 in FIG. 9.

The segmentation process which is made possible by this sub-assembly 150 leads to a division of the image into regions of which only some ones correspond effectively to textures. To establish the distinction between these regions and those which do not correspond to textures or to textures only, a second sub-assembly 250 for separating the regions is provided.

This sub-assembly 250 comprises a polynomial approximation circuit 251 with which attributes or parameters—here particularly the bidimensional polynomials—can be associated with each region and with the aid of which an analytical approximation of each region is available. This operation allows the modelling of the slow variations (low frequency) of the internal texture of a given region obtained from the segmentation.

This polynomial approximation circuit 251 is followed by a polynomial synthesis circuit 252 with which the function approximating the luminance of the original region can be restored. The output signals of this circuit 252 are stored for each region in a memory 253 which will hereinafter be abbreviated to polynomial image memory. A subtraction circuit 254, which receives the output signals of the original image memory 10 and of this polynomial image memory 253, determines the residual difference—or residue—between the original luminance of each region and the corresponding polynomial function. This procedure allows to extract the possible low-frequency component which may be superimposed on a texture in a given region (for example, a shadow on a roof composed of files or slates). The residue is stored for each region in a memory 255 which is followed by a first test circuit 256.

In this test the regions originating from the initial segmentation realised by the sub-assembly 150 can be separated into homogeneous regions and heterogeneous regions. The homogeneous regions are those which, after segmentation, are considered as being solely composed of textures (the examples of the files or slates of a roof, of bricks in a wall, etc. have already been mentioned), even if a low-frequency component is superimposed on them, or those which solely (or almost exclusively, small surfaces of the texture may subsist) have a slow luminance variation. In this case, the heterogeneous regions are all the other regions, i.e. those which do not comprise any texture or comprise only a very minor number of textures on their surface, and whose segmentation is undoubtedly incomplete because the sub-assembly 150 specifically searching the textured regions cannot efficiently be effective for them (it will hereinafter be evident why such minor-textured zones may exist in these regions). For a heterogeneous region, the residue still has strong variations, i.e. an important dynamic behaviour, because the polynomial function has been unable to completely model the luminance variations in the concerned region. In contrast, for a textured homogeneous region or a region having a slow luminance variation, the residue only contains the possible texture information and its statistic characteristics of the first order (average, variance) are substantially constant. The test carried out in the example described here thus consists of computing a local average (local is understood to mean an average evaluated in a neighbourhood of given dimensions of the current pixel) at every pixel of the region examined and of verifying how this average varies (to a very small extent or, in contrast, considerably). If the region corresponds exclusively to a texture, this local average always remains below a threshold. If the region is heterogeneous (because it does not, or not exclusively, correspond to a texture), the local average does not comply with such a criterion. The result of the test is defined by its two possible output signals HM and HE. Dependent on whether the signal is HM or HE, the region concerned corresponds only to a texture or, in contrast, is heterogeneous.

The threshold comparison test may simply and directly relate to the value of the residual difference at every pixel of the concerned region, or, in contrast, to other quantities directly related to this residual difference, without this choice being limitative. In the described example, where the choice relates to a local average, said average is evaluated, for example in a neighbourhood of 24×24 pixels shifting at every pixel of the region. In this shift it is here ensured that the pixels whose neighbourhood is not entirely included in the region are not taken into account. To verify whether said local average does not vary too much, its maximum value $\text{Max}(m_i)$ and its minimum value $\text{Min}(m_i)$ are determined, with $m_i$=the average of the residual value in a neighbourhood centred on the pixel i, and it is verified whether the difference $(\text{Max}(m_i)-\text{Min}(m_i))$ remains below a first threshold $T_1$. When this condition is not verified, the concerned region, which is considered as heterogeneous, should thus be segmented again (for separating the different homogeneous regions having slow luminance variations which subsist in the heterogeneous regions and which, as stated above, may nevertheless include a minor number of small texture zones) before being possibly coded. In the opposite case, the region is homogeneous and may be treated and possibly coded as such.

To this end the system according to the invention comprises, at the output of the second sub-assembly 250 for separating the regions, a third sub-assembly 350 for sorting the homogeneous regions into textured regions and into regions having a slow luminance variation. This sub-assembly 350 comprises a validation switch 355 which is closed only when it receives the output signal HM from the test circuit 256 and, at the output of this switch, a second test circuit 351 for computing for the entire region the standard deviation of the residue with respect to the average (which may in principle be zero) and for comparing this standard deviation with a second threshold $T_2$. If this standard deviation remains below the threshold $T_2$, it means that the residue does not contain any texture and that the concerned region is only a region having a slow (or zero) luminance variation. The modelling stops: the contour information components (given by the image of the labels present in the memory 80) and the region contents information (given by the polynomial coefficients extracted by the circuit 251) are sufficient to define this region and, if means for coding various information components originating from the segmentation are provided in the sub-assembly 350, they may be applied also via validation switches 356 and 357 receiving a control signal for their closure from the test circuit 351 to a circuit 352 for coding the contours and to a circuit 353 for polynomial coding, which circuits thus deliver coded signals corresponding to this first type of region (homogeneous regions having a slow luminance variation). If, in contrast, the standard deviation does not remain below this second threshold $T_2$, the region concerned is a textured region, and if said coding means are provided, the information components relating to the contour and the contents of the region are applied also via a validation switch 358 receiving a control signal for its closure from the circuit 351 to a circuit 354 for coding the textured region.

If provided, this circuit 354 may be, for example of the coding device type described in European Patent Applications EP 0 545 475 and EP 0 547 696 previously filed in the name of the Applicant and it will therefore not be described in detail. The principle of such a coding process is based on the fact that texture signals have a certain repetitive effect and that taking a sample of the texture may be sufficient for reconstituting the whole texture. More particularly, this coding operation consists of extracting a sample of M×N pixels from the region, which sample is coded and then transmitted and/or stored and is simultaneously used to define a dictionary based on blocks which generally have the same size and are extracted from the sample and to transmit for each block of the whole concerned region the address of the closest block in the dictionary (the proximity being defined, for example by evaluation of the minimum quadratic distance).

However, such a coding method is not so appropriate when the textured regions have too small surface areas. It is for this reason that during the segmentation into textured regions it is accepted that in the regions considered as non-textured after said segmentation there are textured zones of a minor surface with respect to the surface of the rest of the region where such zones are present. In fact, these little surfaces are proximate to or smaller than that of the sample of the texture which would be extracted in such a zone whereas this coding method (by extraction of samples, transmission of these samples and synthesis of the region to be reconstituted by searching the closest blocks in a pre-constituted dictionary) is really interesting and economical only if the surface of this region is distinctly larger than that of the sample which corresponds thereto. It is thus quite admissible that the initial device for segmentation of images composed of textures provides a multiresolution approach which does not initially involve capture of small textured regions.

When, in contrast, the considered region is heterogeneous, it should be segmented again before it is possibly coded. For this operation the system according to the invention comprises, also at the output of the sub-assembly 250 for separating the regions, a fourth sub-assembly 450a for complementary segmentation of the heterogeneous regions. In the embodiment described here, this sub-assembly 450a comprises a series arrangement of a circuit 460 for exclusive selection of the heterogeneous regions, which circuit receives the output signals of the memories 10 and 80 and the output signal HE of the test circuit 256, a memory 451 for storing these heterogeneous regions, a complementary segmentation circuit 455 of the conventional type, a memory 458 for storing the image of the labels resulting from said segmentation, and a polynomial approximation circuit 551 also receiving the output signal of said memory 451 and having a structure which is identical to that of the circuit 251. If means for coding the various segmentation information components are arranged in the sub-assembly 450a, they comprise, in this embodiment, in series with the circuit 551, a polynomial coding circuit 553 which is identical to the circuit 353, and, also in series with the memory 458 but in parallel with the branch comprising the circuits 551 and 553, a contour coding circuit 552. The circuits 552 and 553 supply the coded signals corresponding to each of the regions originating from the complementary segmentation of the heterogeneous regions and which are now homogeneous regions having a slow luminance variation.

It should be noted that the present invention is not limited to the embodiment of the device shown in FIGS. 5 and 6 or to modifications already mentioned, nor to the embodiment of the system shown in FIG. 9.

In the segmentation device shown in FIGS. 5 and 6, the segmentation may be particularly improved by enhancing the resolution. After the segmentation has been performed in accordance with the previously described WSL technique, followed by a possible merging of the regions, the resolution of the boundaries of the regions obtained from this segmentation and merging process is equal to the size of the blocks for assigning the texture parameters (blocks of 16×16 pixels in the embodiment described), which gives these boundaries the form of steps of a staircase. This residual fault is remedied by arranging a sub-assembly 500 for sharpening the contours (see FIG. 6) at the output of the sub-assembly 400.

This sub-assembly 500 comprises a marker extraction circuit 501, followed by a ninth memory 90 for storing the image of markers thus constituted. Arranged at the output of this memory is a second circuit 503 for segmentation by way of computing the watershed lines, receiving the global gradient image present at the output of the sixth memory 60 and the marker image present at the output of this ninth memory 90. This sub-assembly 500 operates as follows. Whereas the texture parameter images and the gradients have so far used macroblocks of 16×16 pixels, the dimensions of the blocks thus constituted are reduced (for example by a division by two, which is a non-limitative example) and a method of extracting the watershed lines is employed on the basis of the new global gradient of the enhanced resolution (double in the case of a division by two of the dimensions) and the nucleus of the regions resulting from the segmentation already realised is used as a marker (the nucleus of a region is the assembly of macropixels of the size chosen which are not located on the contours). This process leads to a new image of labels substituting the one previously stored in the eighth memory 80. The size of the blocks or macropixels is then reduced again (for example by another division by two) for a new process of extracting the watershed lines, and so forth, possibly until the resolution of one pixel is reached. The segmentation is then definitively achieved.

With or without performing these contour sharpening operations, the segmentation device according to the invention comprises in all cases a sequencing stage 600 which constitutes the control logic with which the different required control signals can be supplied. These signals are:

(a) a signal $S_1$ for controlling the position of the switches which authorize the different morphological filtering operations and corresponding memorizations of the four images of texture characteristics;

(b) a signal $S_2$ with which the size of the macropixels can be adjusted, first at the size adopted for the first segmentation (here 16×16 pixels), then at the subsequent sizes (by division of the size by two) during contour sharpening;

(c) a signal $S_3$ for initializing the possible operations of merging the adjacent regions;

(d) a signal $S_4$ for triggering during the initial segmentation the segmentation process by computation of the watershed lines;

(e) a signal $S_5$ for triggering the complementary segmentation process during sharpening of the contours of the regions obtained after said initial segmentation.

The signal $S_1$ is thus received by the switches 5 and 36, the signal $S_2$ is received by the sub-sampling circuits 45 to 48, the signal $S_3$ is received by the classification circuit 401, the signal $S_4$ is received by the first segmentation circuit 75 and the signal $S_5$ is received by the second segmentation circuit 503.

It should also be noted that a segmentation device having four paths each corresponding to a distinct morphological filtering operation is realised and described in this case, but that the invention is already carried into effect if it comprises at least one path which, in this case, correspond to a single morphological filtering operation. In this simplified embodiment, the switches 5 and 36 and the adder 59 are no longer provided. This single-path embodiment allows to segment the image by isolating a single region from the rest of this image. It should also be noted that, regardless of the number of paths, the size, the shape and the orientation of the structuring element may be modified for extracting any type of texture characteristic without passing beyond the scope of the invention.

Figure 10:
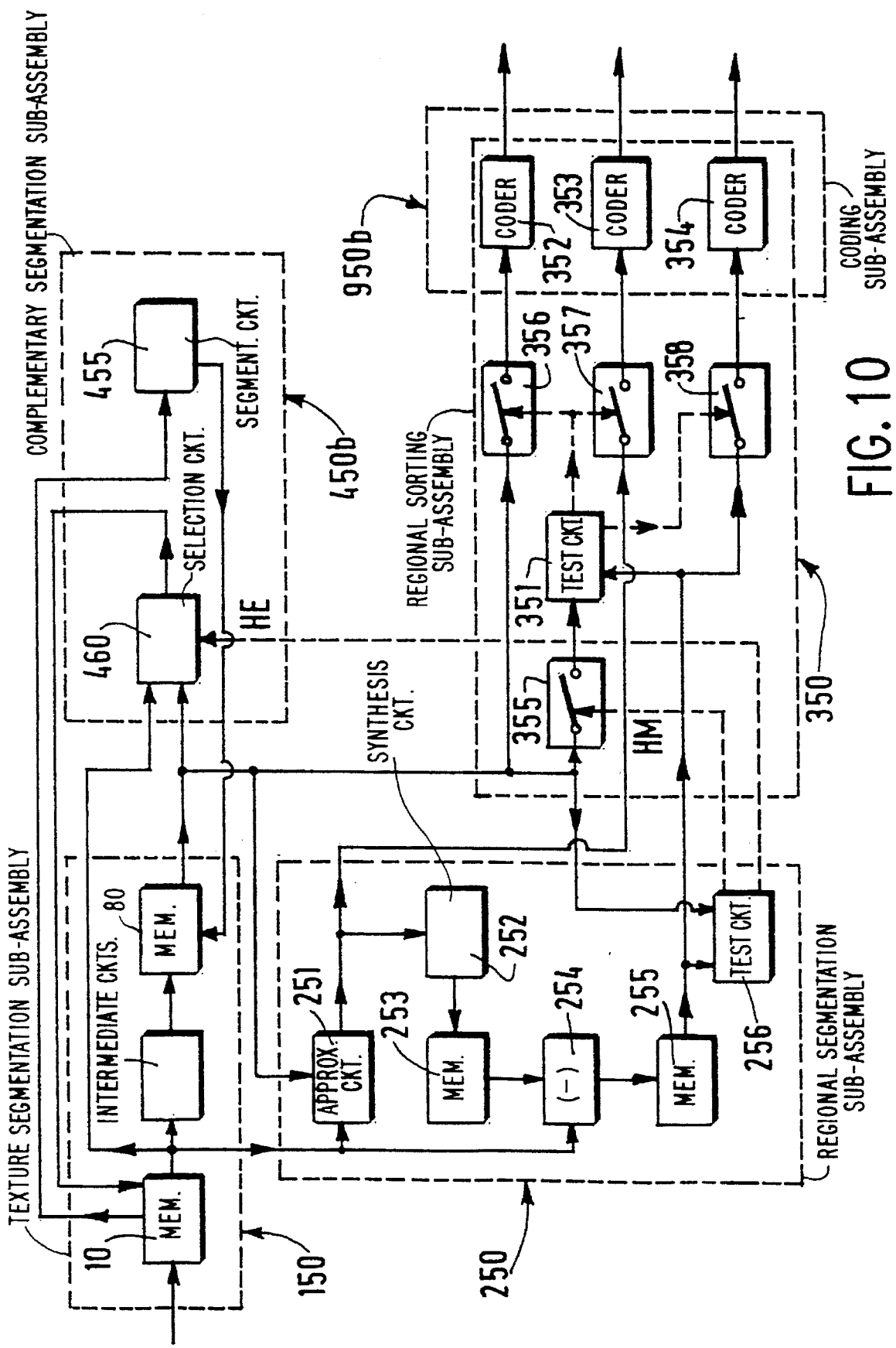

In the case of the image segmentation system shown in FIG. 9 it is possible to reduce the number of circuits and thus the cost of the system, which is realised with the simplified modification of this system shown in FIG. 10. In the fourth sub-assembly for complementary segmentation of the heterogeneous regions, which is now denoted by the reference numeral 450b, the output signal of the circuit 460 for exclusive selection of the heterogeneous regions is no longer applied to the memory 451, which is not provided here, but to the first memory 10 for storing the digital signals which are representative of the initial image to be segmented. An output signal of this memory 10 is now applied to the complementary segmentation device 455. The output signal of this device 455 is no longer applied to the memory 458, which is not provided here, but to the eighth memory 80 for storing the image of the labels, which memory from now on comprises, after said complementary segmentation, the new image of labels corresponding to the assembly of regions identified in the course of the whole number of realised segmentation operations. The possible coding of various segmentation information components which was realised in the sub-assembly 450a by the circuits 552 and 553, is now effected by the circuits 352 and 353.

It is to be noted that the order of polynomials as well as the thresholds are not fixed values. These values may be modified via control signals (not shown in the Figures) from the sequencing stage 600 of the segmentation device.

A device and a system for segmentation have been described, but it will be evident that this segmentation system may include the means for coding the various information components supplied after the segmentation operations and corresponding to each identified region, respectively. Such coding means have been mentioned in the course of this description by signalizing their possible character and comprise more specifically the circuits 352 to 354 and the circuits 552 and 553. It is even possible to replace the circuits 352 and 552, which are identical, by a single circuit performing the same function, as well as the circuits 353 and 553, which are also identical, by another single circuit. With or without this replacement, the coding means may not be incorporated in the sub-assembly 350 or 450a or 450b, but regrouped instead in one coding sub-assembly denoted by the reference numeral 950a or 950b in FIGS. 9 and 10, respectively.

I claim:

1. A device for segmenting, under the control of a sequencing stage for furnishing corresponding control signals, a received textured image on the basis of digital signals which are representative thereof, the segmenting including characterizing each texture by representative parameters and image decomposition into regions having different textures; said device comprising:

for characterization of texture, a first sub-assembly following by a second sub-assembly; the first sub-assembly including means for generating a directionally morphologically filtered signal and a difference between said received image and said directionally morphologically filtered signal; the second sub-assembly including means for determining texture parameters of said filtered image by computing a morphological gradient from said difference; and for regional decomposition of the filtered image, a third sub-assembly at the output of said second sub-assembly; said third sub-assembly including means for image segmentation of the morphological gradient by the technique of extracting watershed lines.

2. A device for segmenting, under the control of a sequencing stage for furnishing corresponding control signals, a received textured image on the basis of digital signals which are representative thereof, the segmenting including characterizing each texture by representative parameters and image decomposition into regions having different textures; said device comprising:

for characterization of texture, a first sub-assembly following by a second sub-assembly; the first sub-assembly subjecting the received image to directional morphological filtering to derive a directionally morphologically filtered image; the second sub-assembly determining texture parameters of said filtered image; and for regional decomposition of the filtered image, a third sub-assembly at the output of said second sub-assembly; said third sub-assembly subjecting the texture parameters of the filtered image to regional segmentation by the technique of extracting watershed lines in a texture parameter image divided into blocks of a predetermined size;

(A) said first sub-assembly for directional morphological filtering comprises:
  (a) a first memory for storing the received image to be segmented;
  (b) at the output of said first memory a first filter circuit for subjecting the received image to directional morphological filtering, thereby deriving a directional morphologically filtered image;
  (c) a second memory for storing the filtered image; and
  (d) a subtracter coupled to said first and second memories for deriving the residue of the difference between the received image and the filtered image, the residue forming a residual image which is stored in a third memory;

(B) said second sub-assembly for determining texture parameters comprises:
  (e) a circuit for integrating said residual image;
  (f) a series arrangement of a fourth memory for storing the integrated image, a circuit for spatial sub-sampling of the integrated image, and a circuit for computing a morphological gradient of the sub-sampled image; and
  (g) a fifth memory for storing a global gradient produced at the output of said computing circuit;

(C) said third sub-assembly for regional decomposition comprises a series of arrangement of:
  (h) a second filter circuit for morphological filtering of the stored global gradient;
  (i) a sixth memory for storing the filtered global gradient;
  (j) a circuit for image segmentation of the filtered, global gradient by the technique of computing watershed lines, thereby deriving an image of regional segmentation labels; and
  (k) a seventh memory for storing said image of regional segmentation labels.

3. A device for segmenting, under the control of a sequencing stage for furnishing corresponding control signals, a received textured image on the basis of digital signals which are representative thereof, the segmenting including characterizing each texture by representative parameters and image decomposition into regions having different textures; said device comprising:

for characterization of texture, a first sub-assembly following by a second sub-assembly; the first sub-assembly subjecting the received image to directional morphological filtering to derive a directionally morphologically filtered image; the second sub-assembly determining texture parameters of said filtered image; and for regional decomposition of the filtered image, a third sub-assembly at the output of said second sub-assembly; said third sub-assembly subjecting the texture parameters of the filtered image to regional segmentation by the technique of extracting watershed lines in a texture parameter image divided into blocks of a predetermined size; wherein (A) said first sub-assembly for directional morphological filtering comprises:
  (a) a memory for storing the received image to be segmented;
  (b) at the output of said memory, a first four-position switch followed by a parallel arrangement of four directional morphological filtering circuits for filtering the stored image, thereby producing four respective directional morphologically filtered images;
  (c) a further memory for sequentially storing the four filtered images;
  (d) a subtracter for sequentially deriving the residue of the difference between the received image and each of the four filtered images, and a further memory for sequentially storing four residual images formed by said residues;

(B) said second sub-assembly for determining texture parameters comprises:
  (e) a circuit for integrating each residual image;
  (f) at the output of said integrating circuit, a second four-position switch followed by four parallel circuit branches respectively comprising a series arrangement of a further memory for storing a respective one of the integrated images, a circuit for spatial sub-sampling of said integrated image, a circuit for computing a morphological gradient of the sub-sampled image, and a memory for storing the computed morphological gradient; and
  (g) an adder for combining the stored morphological gradients of the four integrated images to derive a global gradient, and a further memory for storing said global gradient;

(C) said third-assembly for regional decomposition comprises a series arrangement of:
  (h) a filter circuit for morphological filtering of the stored global gradient;
  (i) a further memory for storing the filtered global gradient;
  (j) a circuit for image segmentation of the filtered global gradient by the technique of computing watershed lines, thereby deriving an image of regional segmentation labels; and
  (k) a further memory for storing said image of regional segmentation labels.

4. A segmentation device as claimed in claim 2, further comprising at the output of said third sub-assembly for regional decomposition a forth sub-assembly for merging the segmented regions in accordance with a hierarchic classification, and successively for each pair of regions in said classification deciding whether or not to merge dependent on a criterion relating to the distribution of pixels in each segmented region.

5. A segmentation device as claimed in claim 2, further comprising at the output of said third sub-assembly for regional decomposition a fourth sub-assembly for sharpening contours in the segmented image by repeating the computation of watershed lines for subdivisions of said image into blocks of successively smaller size, iteratively repeating until the block size reaches the resolution of a pixel.

6. An image segmentation system for segmenting a received image on the basis of digital signals which are representative thereof, said image being composed of textured regions which may be in juxaposition with untextured regions; said system comprising as a first sub-assembly thereof a segmentation device as claimed in claim 2 for segmenting the textured regions of the received image, and further comprising:

a second sub-assembly for separating homogeneous regions of said image, which regions correspond substantially exclusively to textures or slow luminance variation, from heterogeneous regions which do not substantially correspond to textures or slow luminance variation; said separation being effected by determining for each region the residue of the difference between an approximation of the output image produced by said first sub-assembly and the received image, and comparing said residue with a threshold applicable to said region;

at the output of said second sub-assembly, a third sub-assembly for sorting the homogeneous regions into textured regions and regions having a slow luminance variation; and also at the output of said second sub-assembly, a fourth sub-assembly for complementary segmentation of the separated heterogeneous regions.

7. A segmentation system as claimed in claim 6, wherein said second sub-assembly for separating the homogeneous and heterogeneous regions comprises a series arrangement of:

a circuit for polynomial approximation on the basis of the received image to be segmented and images produced by said first sub-assembly during segmentation of textured regions;

a polynominal synthesis circuit for receiving said polynominal approximation and based thereon synthesizing an image which approximates the luminance of each region of the received image;

a memory for storing the synthesized image;

a circuit which for each of said regions derives the residue of the difference between the received image and the synthesized image;

a further memory for storing said residue; and a first test circuit for comparing the stored residue or a quantity directly related thereto with a threshold;

and wherein said third sub-assembly for sorting the homogeneous regions comprises a second test circuit for computing for each of said regions the standard deviation of said residue from the average value thereof, and comparing said standard deviation with a threshold.

8. A segmentation system as claimed in claim 7, wherein said fourth sub-assembly for complementary segmentation of heterogeneous regions comprises a series arrangement of a circuit for selecting the heterogeneous regions, a memory for storing said regions, a segmentation circuit producing an image of regional segmentation labels, and a memory for storing the image of regional segmentation labels.

9. A segmentation system as claimed in claim 7, wherein said fourth sub-assembly for complementary segmentation of the heterogeneous regions comprises:

a series arrangement of a selection circuit for exclusively selecting the heterogenous regions, the output of said selection circuit being connected to an input of an image memory for storing the received image to be segmented; and a segmentation circuit having an input connected to an output of said image memory and an output connected to a memory in said first sub-assembly in which is stored an image of regional segmentation labels of textured regions in said image.

10. A segmentation system as claimed in claim 6, wherein said third sub-assembly for sorting the homogeneous regions and said fourth sub-assembly for complementary segmentation of the heterogeneous regions are each connected to circuit means for coding the relevant sorting and segmentation information for said regions.

11. A segmentation device as claimed in claim 3, further comprising at the output of said third sub-assembly for regional decomposition a fourth sub-assembly for merging the segmented regions in accordance with a hierarchic classification, and successively for each pair of regions in said classification, deciding whether or not to merge dependent on a criterion relating to the distribution of pixels in each segmented region.

12. A segmentation device as claimed in claim 3, further comprising at the output of said third sub-assembly for regional decomposition a fourth sub-assembly for sharpening contours in the segmented image by repeating the computation of watershed lines for subdivision of said image into blocks of successively smaller size, iteratively repeating until the block size reaches the resolution of a pixel.

13. A segmentation device as claimed in claim 11, further comprising at the output of said third sub-assembly for regional decomposition a fourth sub-assembly for sharpening contours in the segmented image by repeating the computation of watershed lines for subdivision of said image into blocks of successively smaller size, iteratively repeating until the block size reaches the resolution of a pixel.

14. An image segmentation system for segmenting a received image on the basis of digital signals which are representative thereof, said image being composed of textured regions which may be in juxaposition with untextured regions; said system comprising as a first sub-assembly thereof a segmentation device as claimed in claim 3 for segmenting the textured regions of the received image, and further comprising:

a second sub-assembly for separating homogeneous regions of said image, which regions correspond substantially exclusively to textures or slow luminance variation, from heterogeneous regions which do not substantially correspond to textures or slow luminance variation; said separation being effected by determining for each region the residue of the difference between an approximation of the output image produced by said first sub-assembly and the received image, and comparing said residue with a threshold applicable to said region;

at the output of said second sub-assembly, a third sub-assembly for sorting the homogeneous regions into textured regions and regions having a slow luminance variation; and also at the output of said second sub-assembly, a fourth sub-assembly for complementary segmentation of the separated heterogeneous regions.

15. A segmentation system as claimed in claim 9, wherein said third sub-assembly for sorting the homogeneous regions and said fourth sub-assembly for complementary segmentation of the heterogeneous regions are each connected to circuit means for coding the relevant sorting and segmentation information for said regions.

* * * * *